United States Patent
Guo

(10) Patent No.: US 11,928,599 B2
(45) Date of Patent: Mar. 12, 2024

(54) METHOD AND DEVICE FOR MODEL COMPRESSION OF NEURAL NETWORK

(71) Applicant: Inspur Suzhou Intelligent Technology Co., Ltd., Suzhou (CN)

(72) Inventor: Shaoyan Guo, Suzhou (CN)

(73) Assignee: Inspur Suzhou Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 17/780,479

(22) PCT Filed: Jul. 23, 2020

(86) PCT No.: PCT/CN2020/103697
§ 371 (c)(1),
(2) Date: May 26, 2022

(87) PCT Pub. No.: WO2021/103597
PCT Pub. Date: Jun. 3, 2021

(65) Prior Publication Data
US 2023/0004809 A1  Jan. 5, 2023

(30) Foreign Application Priority Data
Nov. 29, 2019  (CN) .......................... 201911198187.X

(51) Int. Cl.
*G06N 3/082* (2023.01)
(52) U.S. Cl.
CPC .................................. *G06N 3/082* (2013.01)
(58) Field of Classification Search
None
See application file for complete search history.

(56) References Cited

U.S. PATENT DOCUMENTS

2019/0130250 A1  5/2019  Park

FOREIGN PATENT DOCUMENTS

| CN | 107832847 A | 3/2018 |
| CN | 108304928 A | 7/2018 |

(Continued)

OTHER PUBLICATIONS

Wang et al., "SVD-Based Channel Pruning for Convolutional Neural Network In Acoustic Scene Classification Model", (Jul. 2019) (Year: 2019).*

(Continued)

*Primary Examiner* — Alexey Shmatov
*Assistant Examiner* — Beatriz Ramirez Bravo
(74) *Attorney, Agent, or Firm* — David R. Stevens; Stevens Law Group

(57) ABSTRACT

A method and device for model compression of a neural network. The method comprises: recording input and output parameters of each layer of network in a network structure; dividing the network structure into several small networks according to the input and output parameters; setting a pruning flag bit of a first convolutional layer in each small network to be zero to obtain a pruned small network; training each pruned small network to obtain a network weight and a weight mask; recording a pruned channel index number of each convolutional layer of a pruned small network with the weight mask of zero; and carrying out decomposition calculation on each pruned small network according to the pruned channel index number. According to the method, a calculation amount and the size of a model is reduced, and during network deployment, the model can be loaded with one click, thus reducing usage difficulty.

4 Claims, 1 Drawing Sheet

(56) References Cited

FOREIGN PATENT DOCUMENTS

CN 109978142 A 7/2019
CN 111126595 A 5/2020

OTHER PUBLICATIONS

Shi et al., A Soft-Pruning Method Applied During Training of Spiking Neural Networks for In-memory Computing Applications, (Apr. 2019) (Year: 2019).*
Search Report and Written Opinion, PCT/CN2020/103697, dated Oct. 28, 2020.

* cited by examiner

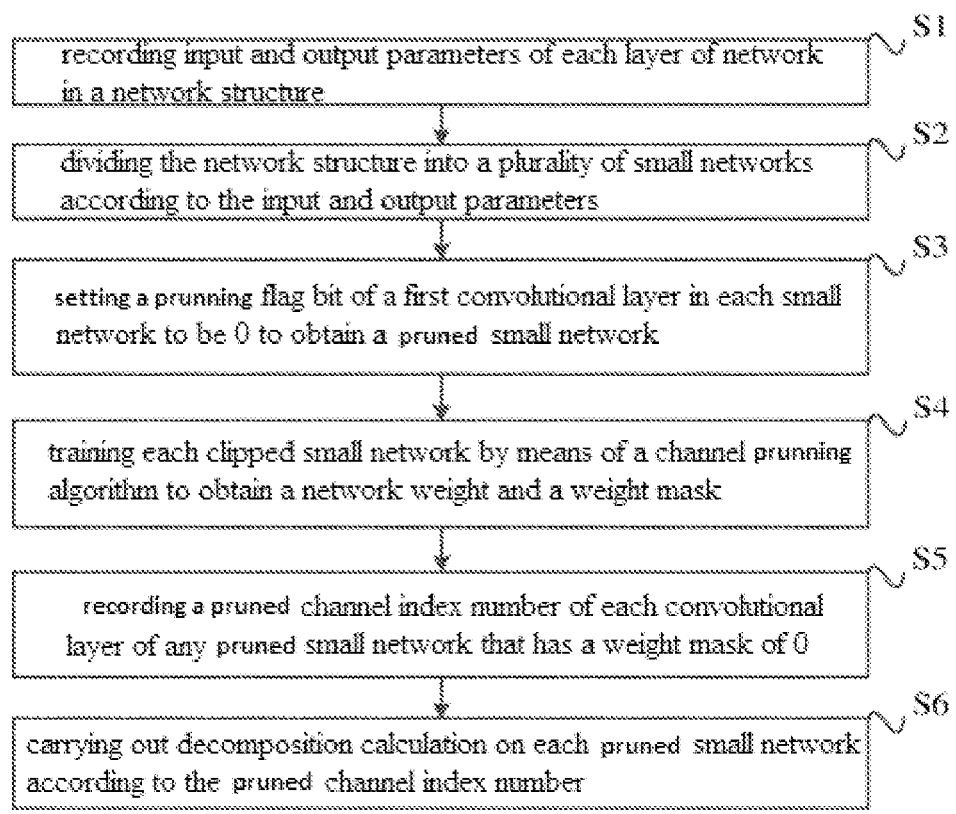

METHOD AND DEVICE FOR MODEL COMPRESSION OF NEURAL NETWORK

CROSS REFERENCE TO RELATED APPLICATIONS

This application claims priority to Chinese Patent Application No. 201911198187.X, filed to the Chinese patent office on Nov. 29, 2019, entitled "METHOD AND DEVICE FOR MODEL COMPRESSION OF NEURAL NETWORK", the entire contents of which are incorporated herein by reference.

TECHNICAL FIELD

The present disclosure relates to the field of computers, and particularly to a method and device for model compression of a neural network.

BACKGROUND

A key technology for a deep neural network is widely applied, in conjunction with the acquisition of big data, to the fields such as image classification, object detection, voice recognition and natural language processing. With the continuous performance improvement of a deep neural network model, there are increasing demands on the volume and calculation of the model, which results in dependence on a calculation platform with high power consumption. In order to solve restrictions on storage resources and the memory access bandwidth in a real-time embedded system and the problem that the calculation resources are relatively insufficient, a technology for compressing the deep neural network model for embedded applications has been researched to reduce the volume of the model and the demand on a storage space and optimize a model calculation process.

Existing deep model compression methods are integrated, and they are mainly divided into four types: parameter pruning and sharing, low-rank factorization, transferred/compact convolutional filters and knowledge distillation. The three methods, namely the low-rank factorization, the transferred/compact convolutional filters and the knowledge distillation, are generally involved in the change of a network structure, and therefore, the present disclosure mainly aims at improving the parameter pruning and sharing.

The existing pruning algorithm includes two types, namely non-structural pruning and structural pruning. A pruned model is embodied in a manner that a numerical value of a weight of the pruned model is 0, a numerical value of a weight of an unpruned model is float data except 0, and therefore, the size of the model is essentially unchanged. In an actual application, a model pruned according to the non-structural pruning algorithm generally adopts a method such as data indexing, so that the actual size of the model is changed. As for a model pruned according to the structural pruning algorithm, the parameter of the current convolutional layer is generally required to be reduced according to a pruning ratio, and corresponding convolutional operation is required to be added on the current convolutional layer according to an index number of a pruned channel. However, the model which is pruned to be compressed is low in compression ratio, and when the model is loaded, a specific decompression module is required to be added; and due to the adoption of a network of a shortcut structure, some convolutional layers are excessively pruned.

SUMMARY

For this objective, an embodiment of the present disclosure aims at providing a method for model compression of a neural network. According to the method, a calculation amount can be directly reduced, the size of a model is reduced, and during network deployment, the model can be loaded with one click, thus reducing the usage difficulty.

Based on the above-mentioned objective, one aspect of an embodiment of the present disclosure provides a method for model compression of a neural network, including the following steps:
  recording input and output parameters of each layer of network in a network structure;
  dividing the network structure into a plurality of small networks according to the input and output parameters;
  setting a pruning flag bit of a first convolutional layer in each small network to be 0 to obtain a small pruned network;
  training each small pruned network by means of a channel pruning algorithm to obtain a network weight and a weight mask;
  recording a pruned channel index number of each convolutional layer of any small pruned network that has a weight mask of 0; and
  carrying out decomposition calculation on each small pruned network according to the pruned channel index number.

According to an embodiment of the present disclosure, the step of recording the input and output parameters of each layer of network in the network structure includes:
  recording an input count, an output count, an input name and an output name of each layer of network in the network structure.

According to an embodiment of the present disclosure, the step of dividing the network structure into the a plurality of small networks according to the input and output parameters includes:
  if both the input count and the output count of the current network layer are 1 and the input name thereof is inconsistent with input name of any other network layer, assigning the current network layer and a previous network layer into the same small network;
  if either the input count or the output count of the current network layer is not 1, assigning the current network layer into one small network; and
  if both the input count and the output count of the current network layer are 1 and the input name thereof is consistent with input name of one of other network layers, assigning the current network layer into one small network.

According to an embodiment of the present disclosure, the channel pruning algorithm includes a dynamic channel pruning algorithm and a channel pruning algorithm based on automatic machine learning.

According to an embodiment of the present disclosure, the step of carrying out decomposition calculation on each small pruned network according to the pruned channel index number includes:
  carrying out sequential traversing from the last layer to the first layer in each small pruned network, and pruning a corresponding index number in an output channel corresponding to a corresponding layer according to the pruned channel index number of the corresponding layer in each small pruned network.

Another aspect of an embodiment of the present disclosure further provides a device for model compression of a neural network, wherein the device includes:

at least one processor; and a memory, wherein the memory stores program codes that can be run by the processor, and when the program codes are run by the processor, the following steps are carried out:

recording input and output parameters of each layer of network in a network structure;

dividing the network structure into a plurality of small networks according to the input and output parameters;

setting a pruning flag bit of a first convolutional layer in each small network to be 0 to obtain a small pruned network;

training each small pruned network by means of a channel pruning algorithm to obtain a network weight and a weight mask;

recording a pruned channel index number of each convolutional layer of any small pruned network that has a weight mask of 0; and carrying out decomposition calculation on each small pruned network according to the pruned channel index number.

According to an embodiment of the present disclosure, the step of recording the input and output parameters of each layer of network in the network structure includes:

recording an input count, an output count, an input name and an output name of each layer of network in the network structure.

According to an embodiment of the present disclosure, the step of dividing the network structure into the a plurality of small networks according to the input and output parameters includes:

if both the input count and the output count of the current network layer are 1 and the input name thereof is inconsistent with input name of any other network layer, assigning the current network layer and a previous network layer into the same small network;

if either the input count or the output count of the current network layer is not 1, assigning the current network layer into one small network; and if both the input count and the output count of the current network layer are 1 and the input name thereof is consistent with input name of one of other network layers, assigning the current network layer into one small network.

According to an embodiment of the present disclosure, the channel pruning algorithm includes a dynamic channel pruning algorithm and a channel pruning algorithm based on automatic machine learning.

According to an embodiment of the present disclosure, the step of carrying out decomposition calculation on each small pruned network according to the pruned channel index number includes:

carrying out sequential traversing from the last layer to the first layer in each small pruned network, and pruning a corresponding index number in an output channel corresponding to a corresponding layer according to the pruned channel index number of the corresponding layer in each small pruned network.

The present disclosure has the following beneficial technical effects: according to the method for model compression of the neural network in accordance with the embodiment of the present disclosure, which adopts the technical solution: recording input and output parameters of each layer of network in a network structure; dividing the network structure into a plurality of small networks according to the input and output parameters; setting a pruning flag bit of a first convolutional layer in each small network to be 0 to obtain a small pruned network; training each small pruned network by means of a channel pruning algorithm to obtain a network weight and a weight mask; recording a pruned channel index number of each convolutional layer of any small pruned network that has a weight mask of 0; and carrying out decomposition calculation on each small pruned network according to the pruned channel index number, a calculation amount can be directly reduced, the size of a model is reduced, and during network deployment, the model can be loaded with one click, thus reducing the usage difficulty.

BRIEF DESCRIPTION OF THE DRAWINGS

In order to describe the technical solutions in the embodiments of the present disclosure or the prior art more clearly, the accompanying drawings required for describing the embodiments or the prior art will be briefly described below. Apparently, the accompanying drawings in the following description show only some embodiments of the present disclosure, and a person of ordinary skill in the art may still derive other accompanying drawings from these accompanying drawings without creative efforts.

FIG. 1 is a schematic process diagram of a method for model compression of a neural network in accordance with an embodiment of the present disclosure.

DETAILED DESCRIPTION

In order to make the objectives, technical solutions and advantages of the present disclosure clearer and more understandable. The embodiments of the present disclosure will be further described in detail below in conjunction with specific embodiments and reference to the accompanying drawings.

Based on the above-mentioned objectives, a first aspect of an embodiment of the present disclosure provides an embodiment of a method for model compression of a neutral network. FIG. 1 shows a schematic process diagram of the method.

As shown in FIG. 1, the method may include the following steps:

S1, input and output parameters of each layer of network in a network structure are recorded, and all the layers may be numbered from the $0^{th}$ layer to the $n^{th}$ layer;

S2, the network structure is divided into a plurality of small networks according to the input and output parameters, and a large network with n layers is divided into m small networks according to different parameters;

S3, a pruning flag bit of a first convolutional layer in each small network is set to be 0 to obtain a small pruned network, and pruning flag bits of other layers are all set to be 1, wherein 0 represents non-pruning, and 1 represents pruning;

S4, each small pruned network is trained by means of a channel pruning algorithm to obtain a network weight and a weight mask, in theory, the small pruned network may be trained by adopting any one channel pruning algorithm to obtain many network parameters, we need to use a weight and its mask herein, if the weight is pruned, the mask is 0, otherwise, the mask is 1;

S5, a pruned channel index number of each convolutional layer of any small pruned network that has a weight mask of 0 is recorded, that is, if the channel is pruned, an index number of the channel is recorded; and S6, decomposition calculation is carried out on each small pruned network according to the pruned channel index number, that is, if there are k layers in the small pruned network, index numbers corresponding to output channels on k-1 layers are pruned according to a channel pruning index number of the $k^{th}$ layer until all layers of the small network are traversed. The finally obtained network parameter only include a weight (unpruned). For example, if a weight is 5×10×3×3 and the index number of the $k^{th}$ layer is recorded as 0, 1, 2 in a second dimension, the index number recorded as 0, 1, 2 in a first dimension in a weight 10×8×3×2 of the $(k-1)^{th}$ layer is pruned.

By means of a compression algorithm for a neural network in accordance with the present disclosure, in a network of a shortcut structure, a network is reasonably pruned, and the performance is guaranteed. It is unnecessary to increase specific convolution operation for the pruned model, the size of a model is directly reduced, and during model reasoning, one-click loading is achieved, and decoding is not needed.

By adopting the above-mentioned technical solution, a calculation amount can be directly reduced, the size of the model is reduced, and during network deployment, the model can be loaded with one click, thus reducing the usage difficulty.

In a preferred embodiment of the present disclosure, the step that the input and output parameters of each layer of network in the network structure are recorded includes:

an input count, an output count, an input name and an output name of each layer of network in the network structure are recorded.

In a preferred embodiment of the present disclosure, the step that the network structure is divided into the a plurality of small networks according to the input and output parameters includes:

if both of the input count and the output count of the current network layer are 1 and the input name thereof is inconsistent with input name of any other network layer, the current network layer and a previous network layer are assigned into the same small network; if either the input count or the output count of the current network layer is not 1, the current network layer is assigned into one small network; and if both the input count and the output count of the current network layer are 1 and the input name thereof is consistent with input name of one of other network layers, the current network layer is assigned into one small network.

In a preferred embodiment of the present disclosure, the channel pruning algorithm includes a dynamic channel pruning algorithm and a channel pruning algorithm based on automatic machine learning. Other channel pruning algorithms may also be used, in theory, any one algorithm may be used.

In a preferred embodiment of the present disclosure, the step that decomposition calculation is carried out on each small pruned network according to the pruned channel index number includes:

sequential traversing is carried out from the last layer to the first layer in each small pruned network, and a corresponding index number in an output channel corresponding to a corresponding layer is pruned according to the pruned channel index number of the corresponding layer (the layer which is currently traversed) in each small pruned network. That is, if there are i layers in the small pruned network, index numbers corresponding to output channels on i-1 layers are pruned according to a channel pruning index number of the $i^{th}$ layer until all layers of the small network are traversed. The finally obtained network parameter only include a weight (unpruned). For example, if a weight is 5×10×3×3 and the index number of the $i^{th}$ layer is recorded as 0, 1, 2 in a second dimension, the index number recorded as 0, 1, 2 in a first dimension in a weight 10×8×3×2 of the $(i-1)^{th}$ layer is pruned.

In the present disclosure, the above-mentioned method may be completed by adding the following two modules in an existing quantization algorithm.

1) A network segmentation module: when channels are pruned, an input channel is selected to be pruned, rather than an output channel, which is due to the fact that: firstly, if the convolutional layer contains bias, it needs to be ensured that the index number of the output channel of the pruned convolutional layer is consistent with the index number of bias; and secondly, a layer adjacent to the convolutional layer is a batchnorm layer (existing network structures are generally cony and batchnorm), during calculation on the batchnorm layer, the pruned channel is restored, thereby making the pruning meaningless. Found in experiments, for a directly-connected network structure, that is, there is only one input and one output on each layer, all convolutional layers may be pruned except the first convolutional layer (for a common CNN having three image input channels, if the channels are directly reduced, it is equivalent to direct reduction of original information of an image). However, for a resnet50 network of the shortcut structure, although all the convolutional layers may be pruned, calculation may not be reduced in practice. The reduction of the input channel of the current convolutional layer is equivalent to the reduction of the output channel of a previous layer (adjacent connection) of the current convolutional layer. When inputs of two convolutional layers come from the same layer, it has to be ensured that the index numbers of the input channels pruned by the two convolutional layers are consistent, however, for two different convolutions, the same index input channels have different importance, and therefore, it is impossible to ensure that the index numbers of the input channels pruned by the two different convolutions are consistent. Therefore, in the shortcut structure, the convolution having single input and single output is only pruned.

2) A channel index compression module: the weight of the pruned network is 0 relative to the pruned input channel. In practice, in order to ensure that the pruned channel does not participate in calculation, a convolutional layer is generally added in front of the convolutional layer, and the pruned channel is masked. However, by means of such a manner, the additional convolutional calculation is increased while the calculation amount of the current layer is reduced. Therefore, in order to realize real direct reduction of the calculation amount, the convolutional calculation and a relationship between connected layers are analyzed, and finally, the convolutional calculation is actually reduced. The core concept is that the currently pruned input channel and the output channel connected with the layer (conv and batchnorm) connected with the input channel may also be accordingly pruned. For the resnet50 network, specific steps include: firstly, a network structure is divided into n subnetworks, and there is only one input and one output on each layer of each subnetwork; and secondly, gradually upward decomposition calculation is carried out from the last layer of each subnetwork, that is, index numbers of pruned channels of the $n^{th}$ layer are recorded, and output channels of the $(n-1)^{th}$ layer are pruned according to the recorded index numbers of channels of the $n^{th}$ layer until all the layers are traversed.

By adopting the above-mentioned technical solutions, flexible control on the safety level of a system can be achieved, the normal operation of service can be ensured, the same set of storage system can meet various demands on safety levels of users, configured contents are simply processed and are prevented from being tedious, the problem that the users cannot directly amend configuration files in the case that the system does not allow to directly amend the files is solved, safety uniformity and flexible control of various services of the storage system are achieved, and the problem that errors may be caused by direct manual amendment of the configuration files is avoided.

It should be noted that, understood by the ordinary skill in the art, the implementation of all or parts of processes in the methods in the above-mentioned embodiments may be completed by relevant hardware instructed by the computer program, the above-mentioned program may be stored in a computer readable storage medium, and the program may include the processes in all the above-mentioned embodiments of the method when being executed. A storage medium of the program may be a magnetic disk, an optical disk, an ROM (Read-Only Memory) or an RAM (Random Access Memory) and the like. The above-mentioned embodiments of the computer program may achieve the same or similar effects as any one of the above-mentioned corresponding embodiments of the method.

In addition, the method disclosed in accordance with the embodiments of the present disclosure may be further implemented as a computer program executed by a CPU, and the computer program may be stored in a computer readable storage medium. When the computer program is executed by the CPU, the above-mentioned functions limited in the method disclosed in accordance with the embodiments of the present disclosure are executed.

Based on the above-mentioned objectives, a second aspect of an embodiment of the present disclosure provides a device for model compression of a neural network, wherein the device includes:

at least one processor; and a memory, wherein the memory stores program codes that can be run by the processor, and when the program codes are run by the processor, the following steps are carried out:

input and output parameters of each layer of network in a network structure are recorded;

the network structure is divided into a plurality of small networks according to the input and output parameters;

a pruning flag bit of a first convolutional layer in each small network is set to be 0 to obtain a small pruned network;

each small pruned network is trained by means of a channel pruning algorithm to obtain a network weight and a weight mask;

a pruned channel index number of each convolutional layer of a small pruned network that has a weight mask of 0 is recorded; and decomposition calculation is carried out on each small pruned network according to the pruned channel index number.

In a preferred embodiment of the present disclosure, the step that the input and output parameters of each layer of network in the network structure are recorded includes:

an input count an output count, an input name and an output name of each layer of network in the network structure are recorded.

In a preferred embodiment of the present disclosure, the step that the network structure is divided into the a plurality of small networks according to the input and output parameters includes:

if both of the input count and the output count of the current network layer are 1 and the input name thereof is inconsistent with input name of any other network layer, the current network layer and a previous network layer are assigned into the same small network; if either the input count or the output count of the current network layer is not 1, the current network layer is assigned into one small network; and if both the input count and the output count of the current network layer are 1 and the input name thereof is consistent with input name of one of other network layers, the current network layer is assigned into one small network.

In a preferred embodiment of the present disclosure, the channel pruning algorithm includes a dynamic channel pruning algorithm and a channel pruning algorithm based on automatic machine learning.

In a preferred embodiment of the present disclosure, the step that decomposition calculation is carried out on each small pruned network according to the pruned channel index number includes:

sequential traversing is carried out from the last layer to the first layer in each small pruned network, and a corresponding index number in an output channel corresponding to a corresponding layer is pruned according to the pruned channel index number of the corresponding layer in each small pruned network.

It should be specifically noted that, in the embodiment of the above-mentioned system, the working processes of various modules are specifically described with the embodiment of the above-mentioned method, and it will be readily envisioned by the skilled in the art that these modules are applied to other embodiments of the above-mentioned method.

In addition, the steps of the above-mentioned method and the units or modules of the system may also be implemented by means of a controller and a computer readable storage medium for storing a computer program enabling the controller to implement the above-mentioned steps or functions of the units or modules.

It should be further understood by those skilled in the art that various exemplary logic blocks, modules, circuits and algorithm steps described in conjunction with the embodiments disclosed herein may be implemented as electronic hardware, computer software or a combination of both. In order to describe such interchangeability of the hardware and the software clearly, general description has been performed according to functions of various schematic components, blocks, modules, circuits and steps. Whether these functions are implemented as hardware or software depends upon specific applications and design constraints applied to the overall system. Those skilled in the art may adopt various methods to achieve the described functions in each specific application, which, however, should not be considered as departing from the scope disclosed by the embodiments of the present disclosure.

The above-mentioned embodiments, particularly any "preferred" embodiments are implemented possible embodiments and are merely proposed for clearly understanding the principle of the present disclosure. Many variations and modifications may be made to the above-mentioned embodiments without departing the spirit and principle of the technology described herein. All the modifications are intended to be included in the scope of the present disclosure and protected by the appended claims.

What is claimed is:

1. A method for model compression of a neural network on a calculation platform in an embedded system, comprising the following steps: recording, by at least one processor, input and output parameters of each layer of network in a network structure; dividing, by the at least one processor, the network structure into a plurality of small networks according to the input and output parameters; setting, by the at least one processor, a pruning flag bit of a first convolutional layer in each small network to be 0 to obtain a small pruned network; training each small pruned network, by means of a dynamic channel pruning algorithm or a channel pruning algorithm based on automatic machine learning that is performed on the calculation platform in the embedded system, to obtain a network weight and a weight mask; recording, by the at least one processor, a pruned channel index number of each convolutional layer of any small pruned network that has a weight mask of 0; and carrying out, by the at least one processor, decomposition calculation on each small pruned network according to the pruned channel index number, so as to obtain a pruned neural network model to reduce demand of storage space and optimize a model calculation process for the embedded system, wherein the step of recording, by the at least one processor, the input and output parameters of each layer of network in the network structure comprises:

recording, by the at least one processor, an input count, an output count, an input name and an output name of each layer of network in the network structure, wherein the step of dividing, by the at least one processor, the network structure into the plurality of small networks according to the input and output parameters comprises: when both the input count and the output count of the current network layer are 1 and the input name thereof is inconsistent with input name of any other network layer, assigning, by the at least one processor, the current network layer and a previous network layer into the same small network; when either the input count or the output count of the current network layer is not 1, assigning, by the at least one processor, the current network layer into one small network; and when both the input count and the output count of the current network layer are 1 and the input name thereof is consistent with input name of one of other network layers, assigning, by the at least one processor, the current network layer into one small network.

2. The method of claim 1, wherein the step of carrying out, by the at least one processor, decomposition calculation on each small pruned network according to the pruned channel index number comprises: carrying out, by the at least one processor, sequential traversing from the last layer to the first layer in each small pruned network, and pruning, by the at least one processor, a corresponding index number in an output channel corresponding to a corresponding layer according to the pruned channel index number of the corresponding layer in each small pruned network.

3. A device for model compression of a neural network on a calculation platform in an embedded system, wherein the device comprises: at least one processor; and a memory, wherein the memory stores program codes that can be run by the processor, and when the program codes are run by the processor, the following steps are carried out: recording input and output parameters of each layer of network in a network structure; dividing the network structure into a plurality of small networks according to the input and output parameters; setting a pruning flag bit of a first convolutional layer in each small network to be 0 to obtain a small pruned network;

training each small pruned network, by means of a dynamic channel pruning algorithm or a channel pruning algorithm based on automatic machine learning that is performed on the calculation platform in the embedded system, to obtain a network weight and a weight mask; recording a pruned channel index number of each convolutional layer of any small pruned network that has a weight mask of 0; and carrying out decomposition calculation on each small pruned network according to the pruned channel index number, so as to obtain a pruned neural network model to reduce demand of storage space and optimize a model calculation process for the embedded system, wherein the step of recording the input and output parameters of each layer of network in the network structure comprises: recording an input count, an output count, an input name and an output name of each layer of network in the network structure, wherein the step of dividing the network structure into the plurality of small networks according to the input and output parameters comprises: when both the input count and the output count of the current network layer are 1 and the input name thereof is inconsistent with input name of any other network layer, assigning the current network layer and a previous network layer into the same small network; when either the input count or the output count of the current network layer is not 1, assigning the current network layer into one small network; and when both the input count and the output count of the current network layer are 1 and the input name thereof is consistent with input name of one of other network layers, assigning the current network layer into one small network.

4. The device of claim 3, wherein the step of carrying out decomposition calculation on each small pruned network according to the pruned channel index number comprises: carrying out sequential traversing from the last layer to the first layer in each small pruned network, and pruning a corresponding index number in an output channel corresponding to a corresponding layer according to the pruned channel index number of the corresponding layer in each small pruned network.

* * * * *